US009203728B2

(12) United States Patent
Pyatkovskiy

(10) Patent No.: US 9,203,728 B2
(45) Date of Patent: Dec. 1, 2015

(54) METADATA CAPTURE FOR TESTING TCP CONNECTIONS

(75) Inventor: Maksim Pyatkovskiy, Encino, CA (US)

(73) Assignee: Ixia, Calabasas, CA (US)

( * ) Notice: Subject to any disclaimer, the term of this patent is extended or adjusted under 35 U.S.C. 154(b) by 334 days.

(21) Appl. No.: 13/044,329

(22) Filed: Mar. 9, 2011

(65) Prior Publication Data

US 2012/0230208 A1 Sep. 13, 2012

(51) Int. Cl.
*H04L 12/26* (2006.01)

(52) U.S. Cl.
CPC ............... *H04L 43/18* (2013.01); *H04L 43/10* (2013.01); *H04L 43/50* (2013.01)

(58) Field of Classification Search
USPC ............... 370/429, 252, 250, 389, 241, 237, 370/395.7, 392; 709/224; 455/456.3, 522; 714/723
See application file for complete search history.

(56) References Cited

U.S. PATENT DOCUMENTS

| 8,055,960 B2* | 11/2011 | Huott | G06F 12/0802 714/710 |
|---|---|---|---|
| 2007/0081471 A1* | 4/2007 | Talley, Jr. | H04L 43/028 370/252 |
| 2008/0075103 A1* | 3/2008 | Noble | H04L 12/2697 370/429 |
| 2008/0095153 A1 | 4/2008 | Fukunaga et al. | |
| 2008/0117907 A1 | 5/2008 | Hein | |
| 2010/0161787 A1* | 6/2010 | Jones | G06F 11/3495 709/224 |
| 2011/0182191 A1* | 7/2011 | Jackson | H04L 12/2697 370/250 |
| 2011/0280137 A1* | 11/2011 | Bockwoldt et al. | ........... 370/252 |

FOREIGN PATENT DOCUMENTS

| EP | 1434386 | 6/2004 |
|---|---|---|
| WO | WO 9326111 | 12/1993 |

OTHER PUBLICATIONS

European Patent Office, European Search Report for European Application No. 12000281.1, mail date Jun. 19, 2012, pp. 1-7.

* cited by examiner

*Primary Examiner* — Andrew Lai
*Assistant Examiner* — Jamaal Henson
(74) *Attorney, Agent, or Firm* — SoCal IP Law Group LLP; John E. Gunther; Steven C. Sererboff

(57) ABSTRACT

Methods, port units, and computer readable storage media for testing network connections are disclosed. A plurality of Transmission Control Protocol (TCP) connections with one or remote devices may be established via a network. Metadata may be extracted from TCP packets transmitted via the plurality of TCP connections and TCP packets received via the plurality of TCP connections. The extracted metadata may be stored in a memory.

36 Claims, 6 Drawing Sheets

(c) 2010 Ixia

METADATA CAPTURE FOR TESTING TCP CONNECTIONS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to receiving and processing traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, 3, and layer 4 of the structure are the physical layer, the data link layer, the network layer, and the transport layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of the Ethernet, ATM, FR, and/or PPP layer 2 protocols. At least some of the nodes of the network may include a router that extracts a destination address from a network layer header contained within each packet. The router then used the destination address to determine the route or path along which the packet should be retransmitted. A typical packet may pass through a plurality of routers, each of which repeats the actions of extracting the destination address and determining the route or path along which the packet should be retransmitted.

Layer 4 protocols govern end-to-end message delivery in a network. In particular, the Transmission Control Protocol (TCP) provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed by one of the devices. Opening and closing a connection both require several steps at which specific messages are exchanged between the two devices. A connection may also be closed when an anticipated response is not received by one device for a predetermined period of time, commonly called a "time-out". A TCP connection is considered to be "stateful" since each device must maintain information describing the state of the connection (being opened, established, being closed), what data has been sent, and what sent data has been acknowledged.

A TCP connection is defined by a pair of IP Addresses (fields in the IP header of each packet of the TCP connection) and a pair of TCP Ports (fields in the TCP header of each TCP packet). TCP Ports define what higher level protocol or process is using the services of the TCP connection. TCP Ports should not be confused with hardware ports (connections between hardware devices and a network). The header of each TCP packet contains a sequence number identifying the first data byte in the TCP packet, and an acknowledgement number identifying the next data byte expected to be received. The sequence and acknowledgement numbers are, in simplified terms, a count of the number of data bytes sent and received, respectively, over the TCP connection. Two devices communicating via a TCP connection maintain data indicating the highest sequence number transmitted and the highest acknowledgement number received. This information can be used to retransmit packets that are not acknowledged in a timely manner.

In order to test a packet switched network or a device included in a packet switched communications network, test traffic comprising a large number of packets may be generated, transmitted into the network at one or more ports, and received at different ports. Each packet in the test traffic may be a unicast packet intended for reception at a specific destination port or a multicast packet, which may be intended for reception at two or more destination ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be both a source of test traffic and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

A series of packets originating from a single port unit and having a specific type of packet and a specific rate will be referred to herein as a "stream." A source port unit may support multiple outgoing streams simultaneously and concurrently, for example to accommodate multiple packet types, rates, or destinations. "Simultaneously" means "at exactly the same time." "Concurrently" means "within the same time."

For the purpose of reporting network traffic data, the test traffic may be organized into packet groups, where a "packet group" is any plurality of packets for which network traffic statistics are reported. Each stream may consist of a single packet group or a plurality of packet groups. Each packet group may typically belong to a single stream.

In order to diagnose problems in a network under test or in a test system, packets may be captured or stored for later analysis. For example, TCP packets may be stored to allow diagnosis of problems such as excessive retransmissions or unexpected connection terminations. Traditionally, entire received packets were stored in memory. This approach, however, requires a substantial amount of memory. Further, a time consuming search operation must be performed to retrieve packets associated with a specific TCP connection. Even if the number of packets to be stored is reduced by hardware or software filters, the amount of memory required to store more than a few seconds of received test traffic may be prohibitive. Additionally, memory bus throughput and memory latency limit the rate at which packets can be captured, thus reducing the performance of the test system.

Throughout this description, elements appearing in block diagrams are assigned three-digit reference designators, where the most significant digit is the figure number and the two least significant digits are specific to the element. An element that is not described in conjunction with a block diagram may be presumed to have the same characteristics and function as a previously-described element having a reference designator with the same least significant digits.

In block diagrams, arrow-terminated lines may indicate data paths rather than signals. Each data path may be multiple bits in width. For example, each data path may consist of 4, 8, 16, 64, 256, or more parallel connections.

DETAILED DESCRIPTION

Description of Apparatus

Figure 1:
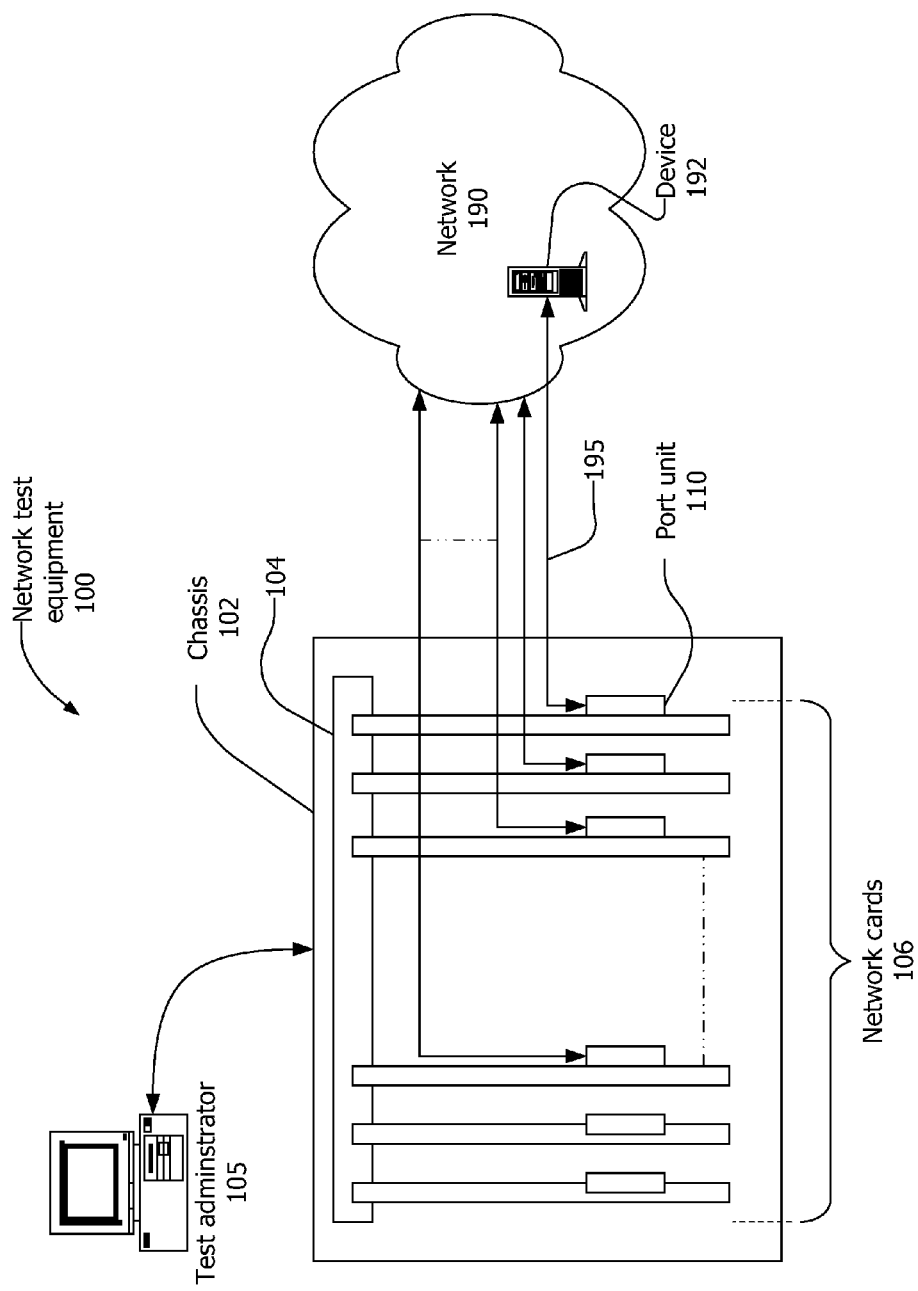
FIG. 1 is a block diagram of a network environment.

FIG. 1 shows a block diagram of a network environment. The environment may include network test equipment 100, a network 190 and plural network devices 192.

The network test equipment 100 may be a network testing device, performance analyzer, conformance validation system, network analyzer, or network management system. The network test equipment 100 may include one or more network cards 106 and a backplane 104 contained or enclosed within a chassis 102. The chassis 102 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The network cards 106 may include one or more field programmable gate arrays (FPGAs), application specific integrated circuits (ASICs), programmable logic devices (PLDs), programmable logic arrays (PLAs), processors and other kinds of devices. In addition, the network cards 106 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 106 may contain one or more port unit 110. Each port unit 110 may connect to the network 190 through one or more ports. Each port unit 110 may be connected to the network 190 through a communication medium 195, which may be a wire, an optical fiber, a wireless link, or other communication medium. Each network card 106 may support a single communications protocol, may support a number of related protocols, or may support a number of unrelated protocols. The network cards 106 may be permanently installed in the network test equipment 100 or may be removable.

The backplane 104 may serve as a bus or communications medium for the network cards 106. The backplane 104 may also provide power to the network cards 106.

The network devices 192 may be any devices capable of communicating over the network 190. The network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 192 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 195. The network itself may be comprised of numerous nodes providing numerous physical and logical paths for data to travel.

Figure 2:
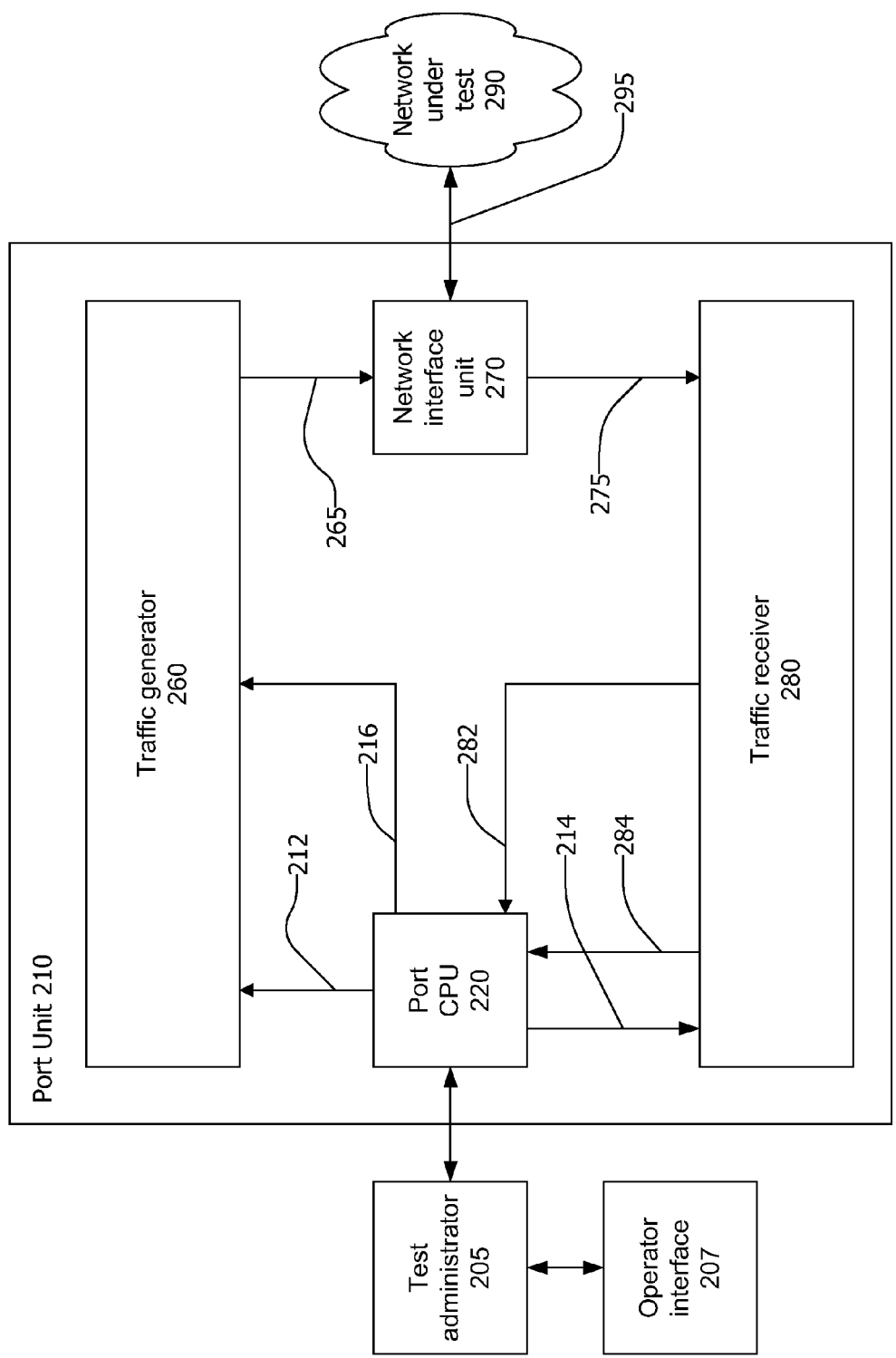
FIG. 2 is a block diagram of a port unit.

Referring now to FIG. 2, an exemplary port unit 210 may include a port central processing unit (CPU) 220, a traffic generator 260, a traffic receiver 280, and a network interface unit 270 which couples the port unit 210 to a network under test 290. The port unit 210 may be all or part of a network card such as the network cards 106.

The port CPU 220 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port CPU 220 may communicate with a test administrator 205. The test administrator 205 may be a computing device contained within, or external to, the network test equipment 100. The test administrator 205 may provide the port CPU 220 with instructions and data required for the port unit to participate in testing the network under test 290. The instructions and data received from the test administrator 205 may include, for example, definitions of packet streams to be generated by the port unit 210 and definitions of performance statistics that may be accumulated and reported by the port unit 210.

The port CPU 220 may provide the traffic generator 260 with stream forming data 212 to form a plurality of streams. The stream forming data 212 may include, for example, the type of packet, the frequency of transmission, definitions of fixed and variable-content fields within the packet and other information for each packet stream. The traffic generator 260 may then generate the plurality of streams in accordance with the stream forming data 212. The plurality of streams may be interleaved to form outgoing test traffic 265. Each of the streams may include a sequence of packets. The packets within each stream may be of the same general type but may vary in length and content.

The network interface unit 270 may convert the outgoing test traffic 265 from the traffic generator 260 into the electrical, optical, or wireless signal format required to transmit the test traffic to the network under test 290 via a link 295, which may be a wire, an optical fiber, a wireless link, or other communication link. Similarly, the network interface unit 270 may receive electrical, optical, or wireless signals from the network over the link 295 and may convert the received signals into incoming test traffic 275 in a format usable to the traffic receiver 280.

The traffic receiver 280 may receive the incoming test traffic 275 from the network interface unit 270. The traffic receiver 280 may determine if each received packet is a member of a specific flow, and may accumulate test statistics for each flow in accordance with test instructions 214 provided by the port CPU 220. The accumulated test statistics may include, for example, a total number of received packets, a number of packets received out-of-sequence, a number of received packets with errors, a maximum, average, and minimum propagation delay, and other statistics for each flow. The traffic receiver 280 may also capture and store selected packets in accordance with capture criteria included in the test instructions 214. The traffic receiver 280 may provide test statistics and/or captured packets 284 to the port CPU 220, in accordance with the test instructions 214, for additional analysis during, or subsequent to, the test session.

The outgoing test traffic 265 and the incoming test traffic 275 may be primarily stateless, which is to say that a substantial portion of the outgoing test traffic 265 may be generated by the traffic generator 260 without expectation of any response and the incoming test traffic 275 may be received by the traffic receiver 280 without any intention of responding. The transmission and reception of stateless traffic may be sufficient to perform layer 2 and layer 3 testing of the network under test 290. However, to test the layer 4 (or higher layer) performance of a network device such as a server or server load balancer, a large number of TCP connections may be required between the port unit 210 and the network under test 290 during a test session.

To establish and use TCP connections, the port CPU 220 may prepare appropriate TCP packets and provide the TCP packets 216 to the traffic generator 260. The traffic generator 260 may insert the TCP packets into the outgoing test traffic 265. The traffic receiver 280 may separate received TCP packets from received stateless traffic and send the received TCP packets 282 to the port CPU 220 for processing.

Figure 3:
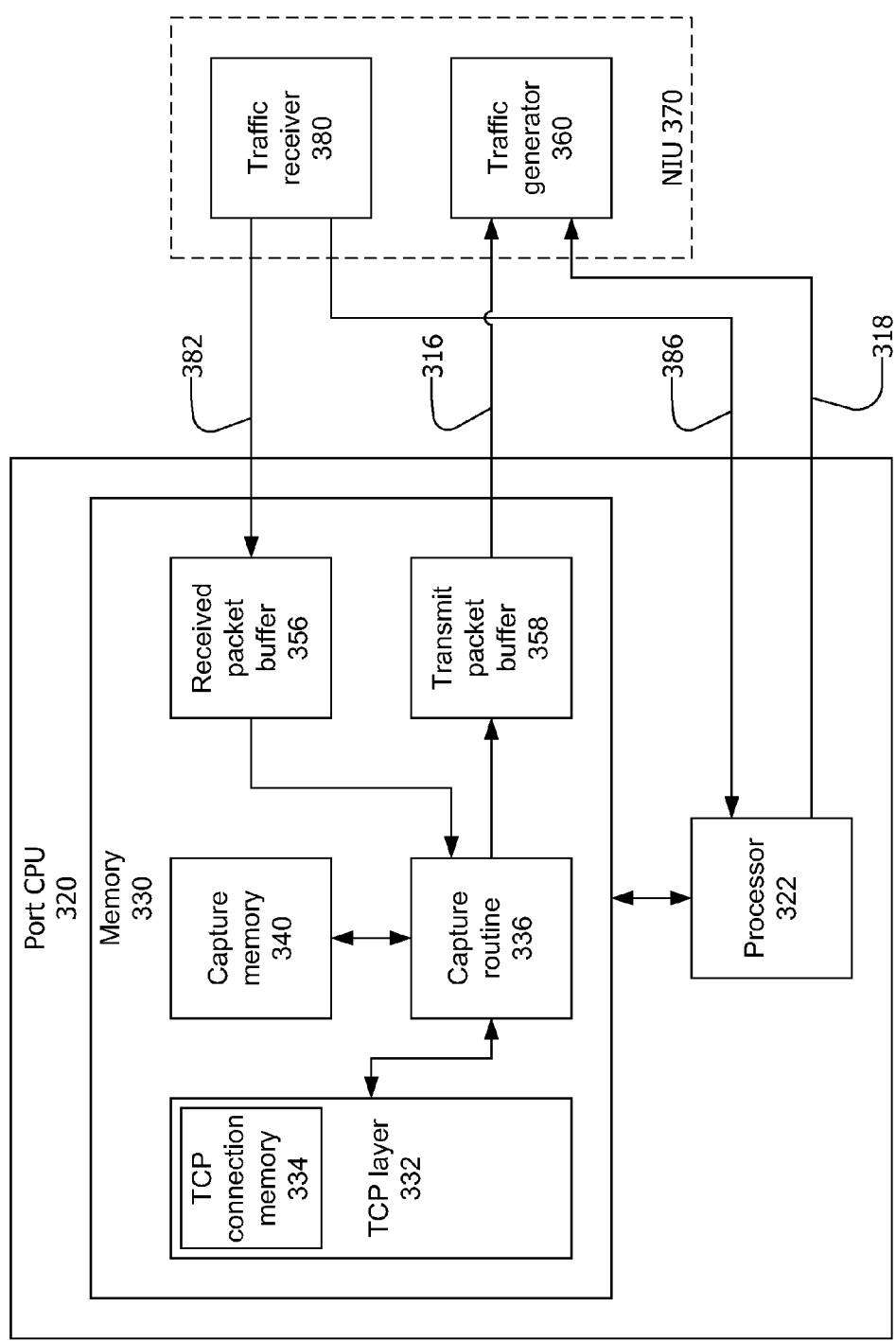
FIG. 3 is a block diagram of a port CPU.

Referring now to FIG. 3, a port CPU 320 may include a processor 322 coupled to a memory 330. The memory 330 may include random access memory, or a combination of random access memory and other memory such as read-only memory and flash memory. The memory 330 may store both data and program instructions for execution by the processor 322. The processor 322 and the memory 330 may be coupled to a traffic receiver 380 and a traffic generator 360, which may collectively form a network interface unit (NIU) 370.

The memory 330 may include a received packet buffer 356. The received packet buffer 356 may have capacity to store at least the longest anticipated received packet. The received packet buffer 356 may have capacity to store multiple packets. A traffic receiver 380 may write one or more received packets into the received packet buffer 356, for example using direct memory access. After each received packet is stored, the traffic receiver 380 may send a signal 384 (such as an interrupt, a flag, or another signal) to the processor 322 indicating that a received packet is waiting in the received packet buffer 356.

The memory 330 may include a transmit packet buffer 358. The transmit packet buffer 358 may have capacity to store at least the longest anticipated packet to be transmitted. The transmit packet buffer 358 may have capacity to store multiple packets. The processor 322 may write one or more packets to be transmitted into the transmit packet buffer 358. After each packet to be transmitted is stored, the processor 322 may send a signal (such as an interrupt, a flag, or another signal) to a traffic generator 360 indicating that a packet to be transmitted is waiting in the transmit packet buffer 358. The traffic generator 360 may then extract the packet to be transmitted from the transmit packet buffer 358, for example by direct memory access.

Programs stored in the memory 330 may include a TCP layer program 332 that causes the processor 322 to open, manage, and close TCP connections with a network under test (not shown). The TCP layer program 332 may be a layer within a TCP/IP protocol stack operating on the port CPU 320. The port CPU 320 may be configured to maintain a large plurality of concurrent TCP connections with the network under test, and may open a million or more TCP connections during a network test session. For each TCP connection, the processor 322 may send packets via the transmit packet buffer 358 and the traffic generator 360, and may and receive packets via the traffic receiver 380 and the received packet buffer 356. For each TCP connection, the processor 322 may store TCP connection data in a TCP connection memory 334 within the memory 330. The stored TCP connection data may include, for example, the state of the connection, the highest sequence number transmitted, and the highest sequence number acknowledged.

A TCP connection is defined by a 32-bit assuming (IP.v4) IP source address, a 32-bit IP destination address, a 16-bit TCP source port, and a 16-bit TCP destination port. Every packet transmitted or received via the TCP connection will contain the same two 32-bit IP addresses assuming (IP.v4) and the same two 16-bit TCP port numbers within the header of the packet. Thus a TCP connection is defined by a 96-bit number, obtained by concatenating the two 32-bit IP addresses and two 16-bit TCP port numbers, allowing a total of $2^{96}$ or $8 \times 10^{28}$ unique TCP connections. However, limitations on hardware and memory dictate that only a small fraction of the possible TCP connections may exist simultaneously.

Each open TCP connection may be associated with a connection identifier having a length substantially smaller than 96 bits. Commonly, the connection identifier may be a hash of the 96-bit number that defines each TCP connection, which is to say a connection identifier may be generated by applying a hash function to the 96-bit number that defines the associated TCP connection. A hash function is any algorithm or mathematical function that converts a larger amount of data into a smaller datum, usually a single integer that may serve as an index to an array. The value returned by a hash function is called a hash value. For example, a port unit may be designed to accommodate up to $2^{18}$, or 262,144, simultaneous TCP connections. In this case, a hash function may be used to convert the 96-bit number that defines each TCP connection into an 18-bit hash value, or connection identifier that uniquely identifies the TCP connection. The TCP connection identifier may be used as an index or pointer to address the TCP connection memory 334.

Programs stored in the memory 330 may also include a capture routine 336 that causes the processor 322 to capture selected portions, or metadata, from each received TCP packet and each TCP packet to be transmitted. The metadata may be extracted from each TCP packet and stored in a capture memory 340 within the memory 330. Metadata may be extracted from received TCP packets as the received TCP packets are removed from received packet buffer 356, before the received packets are processed by the TCP layer program 332. Metadata may be extracted from TCP packets to be transmitted after the TCP packets are created by the TCP state machine program, before the TCP packets to be transmitted are stored in the transmit packet buffer 358.

The capture memory 340 may be partitioned into a number of capture buffers, each of which is used to store information relating to a single TCP connection. Each capture buffer may be dedicated to a corresponding specific TCP connection, such that the number of capture buffers is equal to the number of possible values of the TCP connection identifier. Capture buffers may be dynamically assigned, such that an available buffer is assigned when a TCP connection is opened. When the TCP connection is closed, the assigned buffer may be released and subsequently assigned to a different TCP connection. When capture buffers are dynamically assigned, a pointer to the assigned capture buffer may be included in the TCP connection data stored in the TCP connection memory 334 for each open TCP connection.

Figure 4:
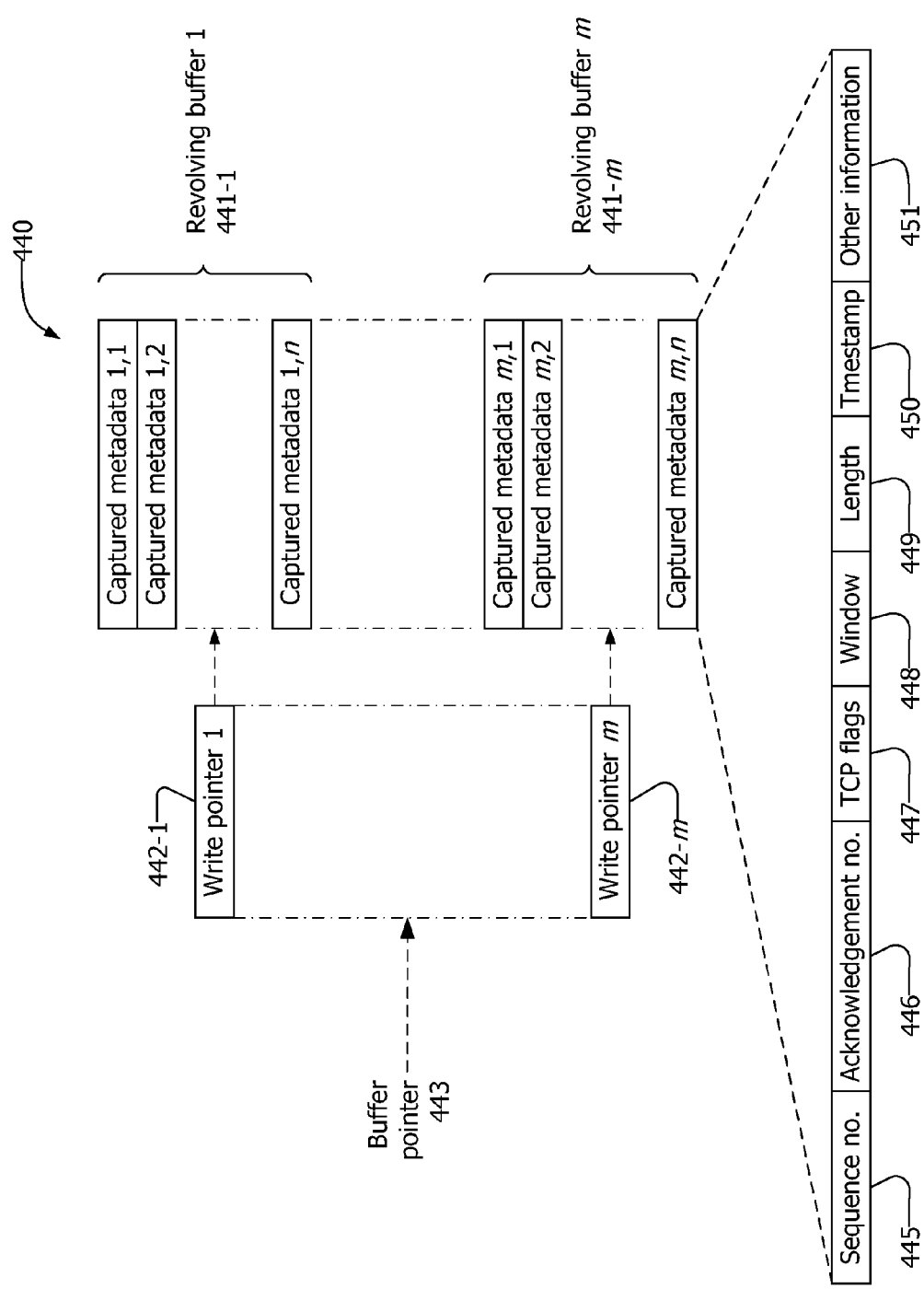
FIG. 4 is a graphical representation of a capture buffer.

Referring now to FIG. 4, a capture memory 440, which may be suitable for use as the capture memory 340, may include a plurality of m revolving buffers, of which revolving buffer 441-1 and revolving buffer 441-*m* are identified. A revolving buffer is a memory having capacity for a finite number of entries where, once the revolving buffer has been filled, each new entry is written over the oldest entry presently stored. Each revolving buffer may be uniquely associated with a corresponding one of a plurality of open TCP connections. In this patent, the term "uniquely associated" means that there is a one-for-one correspondence between two groups of items. In this context, there is a one-for-one correspondence between revolving buffers and open TCP connections. A revolving buffer may be assigned to a specific TCP connection when the connection is opened. An assigned revolving buffer may be released when the specific TCP connection is closed. A released revolving buffer may subsequently be assigned to another TCP connection. The stored connection data for each TCP connection may include a buffer pointer 443 that identifies the revolving buffer 441-1 to 444-*n* assigned to the TCP connection.

In FIG. 4, each revolving buffer 441-1 to 441-*m* has the capacity to store captured metadata for n packets, where n is an integer greater than 2. n may conveniently be a power of two. To allow the stored metadata to be used to diagnose TCP connection problems, n may be equal to sixteen, thirty-two, or more. A plurality of write pointers 442-1 to 442-*m* may be uniquely associated with the plurality of revolving buffers 441-1 to 441-*m*. Each of the write pointers 442-1 to 442-*m* may contain a pointer to a location in the corresponding revolving buffer 441-1 to 441-*m* where the next block of captured metadata should be written. In this patent, a pointer is a value that either is a memory address or can be converted into a memory address. Converting a pointer into a memory address may involve multiplying the pointer value by a predetermined factor and/or adding a predetermined offset to the pointer value.

When metadata for a particular packet is ready to be written into the capture memory 440, a buffer pointer 443 for the packet may be obtained from the TCP layer program 332. When metadata for a packet to be transmitted is written into the capture memory 440, the buffer pointer 443 may be provided by the TCP layer program 332 along with the packet. When a TCP packet is received, a connection identifier may be determined. The connection identifier may be, for example, a hash value calculated as previously described. The connection identifier may be used by the TCP layer program 332 to retrieve TCP connection data from the TCP connection memory 334. The TCP connection data may include the buffer pointer 443, which in turn points to the appropriate write pointer 442-1 to 442-*m*. The appropriate write pointer may then be used to store the metadata into the appropriate location within the corresponding revolving buffer 441-1 to 441-*m*. After the metadata has been stored, the write pointer value may be advanced to point to the location at which the next metadata for the same TCP connection should be stored.

After metadata has been stored in all m locations within a revolving buffer 441-1 to 441-*m*, the associated write pointer 442-1 to 442-*m* may be set to point to the first location within the revolving buffer. Thereafter, the write pointer 442-1 to 442-*m* may be advanced cyclically to point to the location where the oldest metadata was stored, such that, at any time, the content of the revolving buffer 441-1 to 441-*m* may be the metadata for the m most-recent packets transmitted or received over the corresponding TCP connection.

The metadata stored for each packet may include a sequence number 445 and an acknowledgement number 446 extracted from the TCP header of each packet. The metadata stored for each packet may also include one or more of TCP flags 447, window size 448, and packet length 449 extracted from the TCP header. The metadata stored for each packet may also include a timestamp 450 recorded upon packet arrival and/or other information 451 such as TCP options or fields extracted from the IP header of each packet.

Storing only the metadata extracted from each received or transmitted TCP packet may greatly reduce the total amount of memory required for data capture, compared to traditional approaches that stored entire packets. For example, 32 or fewer bytes of metadata may be stored for each TCP packet.

Figure 5:
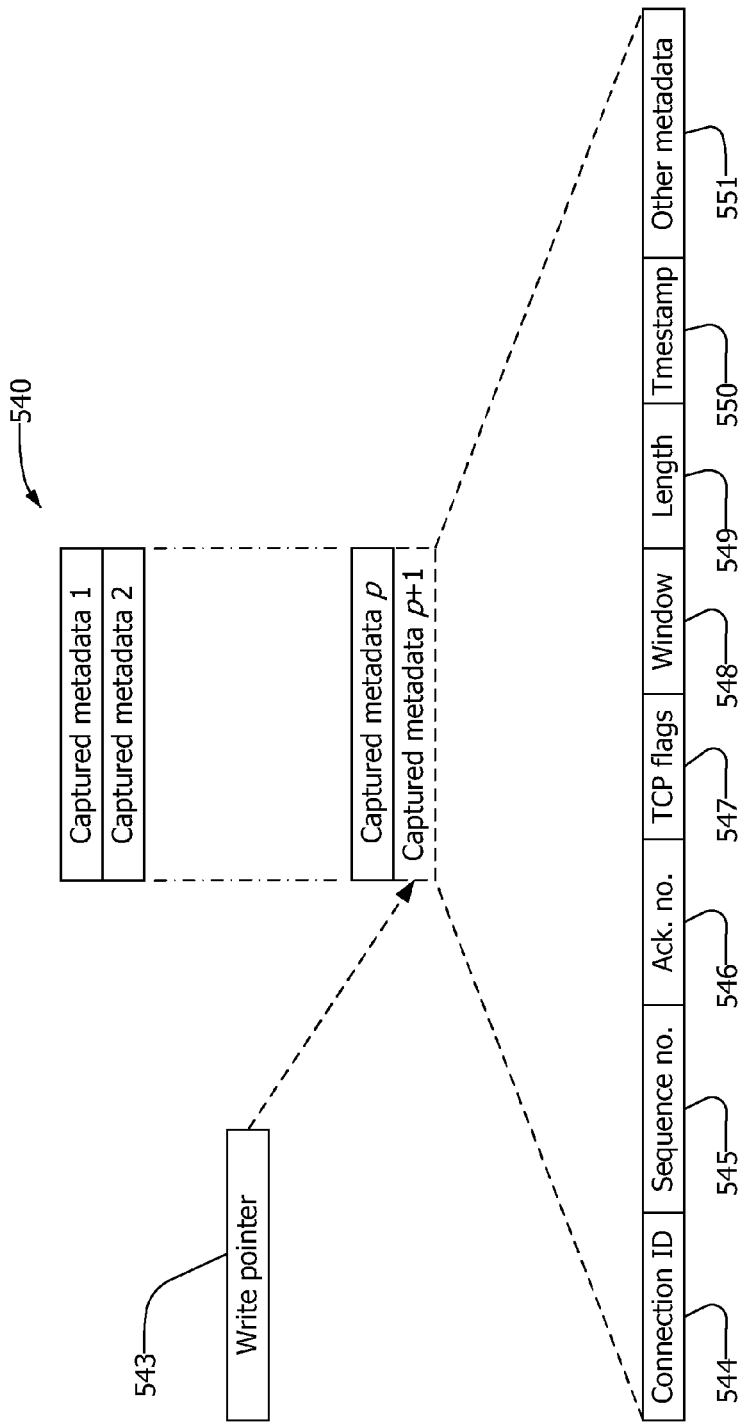
FIG. 5 is a graphical representation of a capture buffer.

Referring now to FIG. 5, a capture memory 540, which may be suitable for use as the capture memory 340, may store a single continuous list of metadata records, identified as captured metadata 1 through captured metadata p. When the metadata is stored in a continuous list, as shown in FIG. 5, a single write pointer 543 may point to the location in the capture memory 540 where the next metadata (captured metadata p+1) will be written. Unlike the capture memory 440 of FIG. 4, metadata associated with a specific TCP connection is not stored in a predetermined portion of the capture memory 540. Thus, to be able to locate metadata for a specific TCP connection, the metadata stored for each packet may include information, such as a connection identifier 544, to identify the associated TCP connection. The metadata for each packet may also include some or all of a sequence number 545, an acknowledgement number 546, TCP flags 547, a window size 548, a packet length 449, a timestamp 550, and other information 551.

Description of Processes

Figure 6:
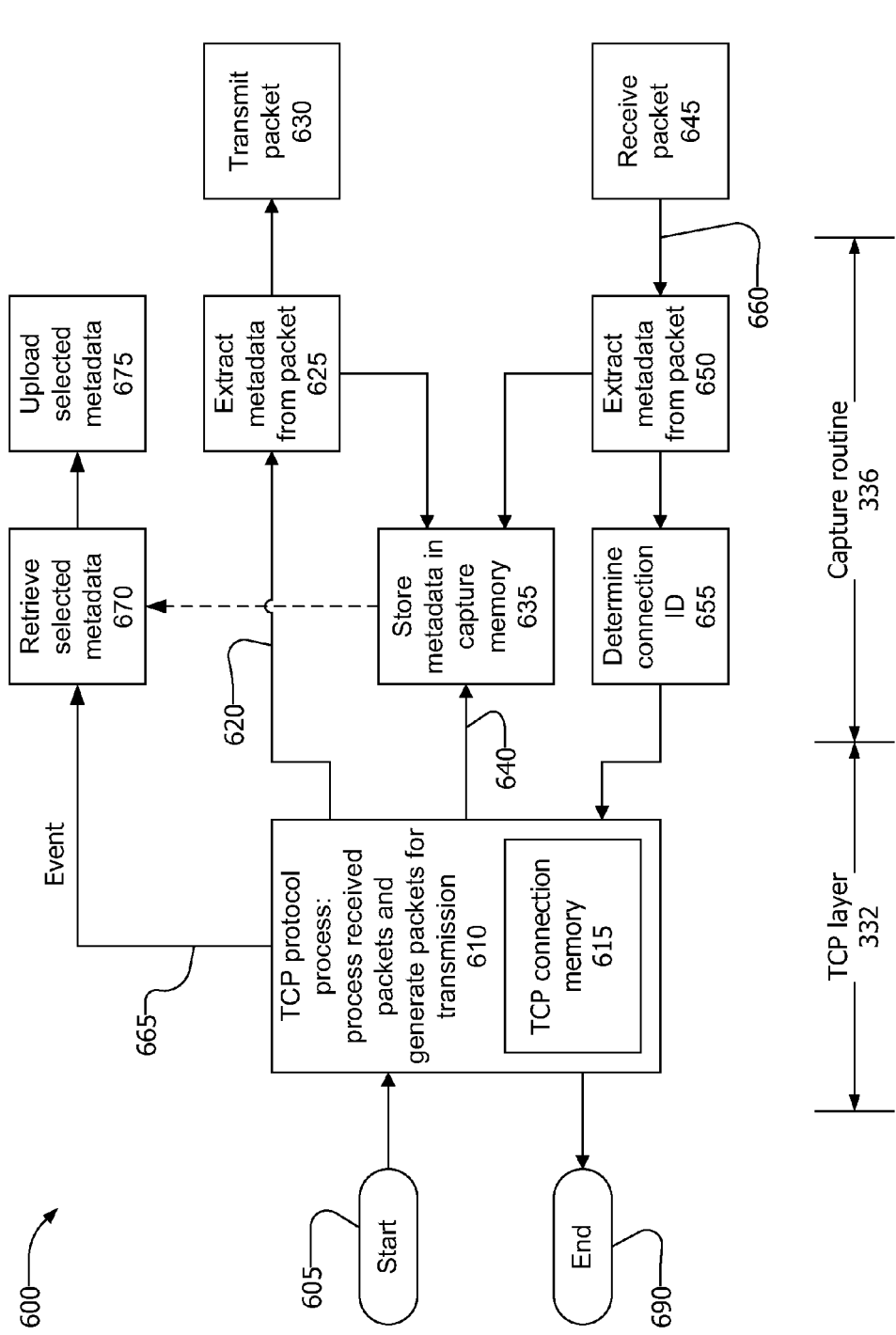
FIG. 6 is a flow chart of a process for capturing TCP metadata.

Referring now to FIG. 6, a process 600 for managing a TCP connection may be performed by a computing device, such as the port CPU 220, executing stored program instructions including a TCP layer program 332 and a capture routine 336. The TCP layer program 332 may be a layer within a TCP/IP protocol stack that implements communications protocols. The process 600 may start at 605 when a request to establish a TCP connection to a remote device is received from, for example, a higher level process, such as an application program, operating on the computing device. The process 600 may end at 690 after the TCP connection is closed.

The process 600 is cyclic in nature, and the actions from 610 to 655 may be performed repeatedly to exchange a plurality of packets with the remote device via the TCP connection. Multiple instances of the process 600 may be performed concurrently to establish and maintain a large plurality of concurrent TCP connections.

After a request to establish a TCP connection is received at 605, a TCP protocol process 610 may exchange a series of TCP packets with the remote device to establish the TCP connection. The TCP protocol process 610 may operate as layer 4 of a TCP/IP protocol stack. Other functions of the TCP protocol process 610 may include generating outgoing TCP packets 620 carrying information to be transmitted to the remote device, retransmitting TCP packets as necessary to ensure the reliability of the TCP connection, maintaining TCP connection data indicating the state of the TCP connection in a TCP connection memory 615, processing incoming TCP packets 660 received from the remote device via the TCP connection, and exchanging a series of packets with the remote device to close the TCP connection. The TCP protocol process 610 may also close the TCP connection when no reply is received from the remote device within a predetermined time period.

At 625, metadata may be extracted from the headers of outgoing TCP packets 620 generated by the TCP protocol process 610. The metadata extracted from each outgoing TCP packet may include source and destination IP addresses, source and destination TCP ports, a sequence number, and acknowledgement number, a window length, flags, and other data. The outgoing packets may then be transmitted to the remote device at 630. Transmitting the outgoing packets at 630 may include processing the packets at layer 3 and layer 2 of the TCP/IP protocol stack followed by transmission over a network by hardware elements such as the traffic generator 260 and the network interface unit 270.

At 635, at least some of the metadata extracted from each packet at 625 may be stored in a memory, such as the capture memory 340. When the capture memory is configured as a plurality of revolving buffers, a shown in FIG. 4, a buffer pointer 640 may be used as an index to store the extracted metadata in the appropriate buffer. The buffer pointer 640 may be provided by the TCP protocol process 610 and may be stored in the TCP connection memory 615 as part of the TCP connection data. When the capture memory is configured as a single list, as shown in FIG. 5, the TCP protocol process may provide a connection ID (not shown) that may be stored in the capture memory along with the extracted metadata.

At 645, packets from the remote device may be received by hardware elements, such as the network interface unit 270 and the traffic receiver 280 and processed by layer 2 and layer 3 of the TCP/IP stack to provide incoming TCP packets 660. Metadata, as previously described, may be extracted from the headers of incoming TCP packets at 650. A connection identifier may be determined for each incoming packet at 655. For example, the connection identifier may be a hash value as previously described. The connection identifier may be used by the TCP protocol process 610 to retrieve connection data for the corresponding TCP connection. The connection data may include the buffer pointer 640. The extracted metadata may be stored at 635 using the buffer pointer 640 as previously described.

In some circumstances, the TCP protocol process 610 may determine that an abnormality or event 665 requiring further analysis has occurred. For example, an event may be the premature closure of a TCP connection due to a failure of the remote device to response within a predetermined period. An event may also be an excessive number of retransmissions for a TCP connection, such as when the number of retransmissions exceeds a predetermined threshold, or when the number of retransmissions within a predetermined time period exceeds a predetermined threshold. An event may also be a request from a higher level process to upload metadata for one or more TCP connections.

In response to an event 665, metadata for one or more selected TCP connections may be retrieved from the capture memory at 670. The metadata retrieved at 670 may be uploaded at 675 to a higher level process or another computing device, such as the test administrator 205, for further analysis. When the capture memory is configured as a plurality of revolving buffers, as shown in FIG. 4, the contents of the revolving buffers corresponding to the selected TCP connections may be retrieved at 670 and uploaded at 675. When the capture memory is configured as a single list, as shown in FIG. 5, at 670 the list may be searched for records containing the connection identifiers corresponding to the selected TCP connections. Records containing connection identifiers corresponding to the selected TCP connections may be uploaded at 675.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method performed by a test system to test network connections, comprising:
  establishing a plurality of Transmission Control Protocol (TCP) connections with one or more remote devices via a network
  storing TCP connection data indicating the state of each of the plurality of TCP connections in a TCP connection memory
  extracting metadata from TCP packets generated and transmitted by the test system via the plurality of TCP connections and TCP packets received by the test system via the plurality of TCP connections
  storing the metadata extracted from every one of the N most recent packets transmitted by the test system or received by the test system via every one of the plurality of TCP connections in a capture memory separate from the TCP connection memory, where N is an integer greater than two.

2. The method of claim 1, wherein
  the metadata includes a sequence number and an acknowledgement number extracted from a TCP header of each transmitted packet and each received packet.

3. The method of claim 2, wherein
  the metadata further includes at least one of TCP flags, a window size, and a length extracted from the TCP header of each transmitted packet and each received packet.

4. The method of claim 2, wherein
  the metadata further includes a timestamp extracted from a payload of each transmitted packet and each received packet.

5. The method of claim 1, wherein each TCP connection is defined by a unique combination of an Internet Protocol (IP) source address, an IP destination address, a TCP source port number, and a TCP destination port number, the method further comprising:
  determining a connection identifier associated with each transmitted TCP packet and each received TCP packet, the connection identifier equal to a hash of an IP source address, an IP destination address, a TCP source port number, and a TCP destination port number contained within the header of each packet.

6. The method of claim 5, wherein
  the capture memory includes a plurality of revolving buffers, each revolving buffer associated with a corresponding one of the plurality of TCP connections, and
  storing the extracted metadata comprises storing the extracted metadata for each TCP connection in the corresponding revolving buffer.

7. The method of claim 6, wherein N is a power of two equal to or greater than sixteen.

8. The method of claim 6, wherein storing the extracted metadata further comprises:
  using the connection identifier associated with each received TCP packet and each transmitted TCP packet as a pointer to the corresponding revolving buffer within the capture memory.

9. The method of claim 6, wherein storing the extracted metadata further comprises:
  using the connection identifier associated with each received TCP packet and each transmitted TCP packet to retrieve a pointer to the corresponding revolving buffer within the capture memory.

10. The method of claim 5, wherein
  storing the extracted metadata comprises storing the extracted metadata in a single continuous list, and
  the metadata stored for each received TCP packet and each transmitted TCP packet includes the associated connection identifier.

11. The method of claim 9, wherein the selected TCP connection is selected based on one of: a request received from the test administrator computing device, a time-out of the selected TCP connection, and a number of retransmissions on the selected TCP connection exceeding a predetermined threshold.

12. The method of claim 1, further comprising:
  transmitting the stored metadata for a selected TCP connection from the plurality of TCP connections to a test administrator computing device.

13. A port unit to test network connections, comprising:
  a network interface unit to transmit TCP packets and receive TCP packets via a network
  a processor coupled to the network interface unit
  a TCP connection memory coupled to the processor
  a capture memory coupled to the processor
  a program memory coupled to the processor and the network interface unit, the program memory storing data and program instructions including instructions that, when executed by the processor, cause the port unit to perform actions comprising:
    establishing a plurality of Transmission Control Protocol (TCP) connections with one or remote devices via the network
    storing TCP connection data indicating the state of each of the TCP connections in the TCP connection memory
    extracting metadata from TCP packets generated and transmitted by the port unit via the plurality of TCP connections and TCP packets received by the port unit via the plurality of TCP connections
    storing the metadata extracted from every one of the N most recent packets transmitted by the port unit or received by the port unit via every one of the plurality of TCP connections in the capture memory, where N is an integer greater than two.

14. The port unit of claim 13, wherein
  the metadata includes a sequence number and an acknowledgement number extracted from a TCP header of each transmitted packet and each received packet.

15. The port unit of claim 14, wherein
the metadata further includes at least one of TCP flags, a window size, and a length extracted from the TCP header of each transmitted packet and each received packet.

16. The port unit of claim 14, wherein
the metadata further includes a timestamp extracted from a payload of each transmitted packet and each received packet.

17. The port unit of claim 13, wherein each TCP connection is defined by a unique combination of an Internet Protocol (IP) source address, an IP destination address, a TCP source port number, and a TCP destination port number, the actions performed further comprising:
determining a connection identifier with each transmitted TCP packet and each received TCP packet, the connection identifier equal to a hash function of an IP source address, an IP destination address, a TCP source port number, and a TCP destination port number contained within the header of each packet.

18. The port unit of claim 17, wherein
the capture memory includes a plurality of revolving buffers, each revolving buffer associated with a corresponding one of the plurality of TCP connections, and
storing the extracted metadata comprises storing the extracted metadata for each TCP connection in the corresponding revolving buffer.

19. The port unit of claim 18, wherein N is a power of two equal to or greater than sixteen.

20. The port unit of claim 18, wherein storing the extracted metadata further comprises:
using the connection identifier associated with each received TCP packet and each transmitted TCP packet as pointer to the corresponding revolving buffer within the capture memory.

21. The port unit of claim 18, wherein storing the extracted metadata further comprises:
using the connection identifier associated with each received TCP packet and each transmitted TCP packet to retrieve a pointer to the corresponding revolving buffer within the capture memory.

22. The port unit of claim 17, wherein
storing the extracted metadata comprises storing the extracted metadata in a single continuous list, and
the metadata stored for each received TCP packet and each transmitted TCP packet includes the associated connection identifier.

23. The port unit of claim 13, the actions performed further comprising:
transmitting the stored metadata for a selected TCP connection from the plurality of TCP connections to a test administrator computing device.

24. The port unit of claim 23, wherein the selected TCP connection is selected based on one of: a request received from the test administrator computing device, a time-out of the selected TCP connection, and a number of retransmissions on the selected TCP connection exceeding a predetermined threshold.

25. A non-transitory computer-readable storage medium storing instructions that, when executed by the processor of a port unit coupled to a network, cause the port unit to perform actions comprising:
establishing a plurality of Transmission Control Protocol (TCP) connections with one or remote devices via the network
extracting metadata from TCP packets generated and transmitted by the port unit via the plurality of TCP connections and TCP packets received by the port unit via the plurality of TCP connections
storing the metadata extracted from every one of the N most recent packets transmitted by the port unit or received by the port unit via every one of the plurality of TCP connections in a memory, where N is an integer greater than two.

26. The non-transitory computer-readable storage medium of claim 25, wherein
the metadata includes a sequence number and an acknowledgement number extracted from a TCP header of each transmitted packet and each received packet.

27. The non-transitory computer-readable storage medium of claim 26, wherein
the metadata further includes at least one of TCP flags, a window size, and a length extracted from the TCP header of each transmitted packet and each received packet.

28. The non-transitory computer-readable storage medium of claim 26, wherein
the metadata further includes a timestamp extracted from a payload of each transmitted packet and each received packet.

29. The non-transitory computer-readable storage medium of claim 25, wherein each TCP connection is defined by a unique combination of an Internet Protocol (IP) source address, an IP destination address, a TCP source port number, and a TCP destination port number, the actions performed further comprising:
determining a connection identifier associated with each transmitted TCP packet and each received TCP packet, the connection identifier equal to a hash of an IP source address, an IP destination address, a TCP source port number, and a TCP destination port number contained within the header of each packet.

30. The non-transitory computer-readable storage medium of claim 29, wherein
the capture memory includes a plurality of revolving buffers, each revolving buffer associated with a corresponding one of the plurality of TCP connections, and
storing the extracted metadata comprises storing the extracted metadata for each TCP connection in the corresponding revolving buffer.

31. The non-transitory computer-readable storage medium of claim 30, wherein N is a power of two equal to or greater than sixteen.

32. The non-transitory computer-readable storage medium of claim 29, wherein storing the extracted metadata further comprises:
using the connection identifier associated with each received TCP packet and each transmitted TCP packet as a pointer to the corresponding revolving buffer within the capture memory.

33. The non-transitory computer-readable storage medium of claim 29, wherein storing the extracted metadata further comprises:
using the connection identifier associated with each received TCP packet and each transmitted TCP packet to retrieve a pointer to the corresponding revolving buffer within the capture memory.

34. The non-transitory computer-readable storage medium of claim 25, the actions performed further comprising:
transmitting the stored metadata for a selected TCP connection from the plurality of TCP connections to a test administrator computing device.

35. The non-transitory computer-readable storage medium of claim 34, wherein the selected TCP connection is selected based on one of: a request received from the test administrator computing device, a time-out of the selected TCP connection, and a number of retransmissions on the selected TCP connection exceeding a predetermined threshold.

36. The non-transitory computer-readable storage medium of claim 29, wherein
- storing the extracted metadata comprises storing the extracted metadata in a single continuous list, and
- the metadata stored for each received TCP packet and each transmitted TCP packet includes the associated connection identifier.

* * * * *